INVENTORS.
ARTHUR SINCLAIR TAYLOR
ELLSWORTH SANDHAGE
GEORGE BOTT
WILLIAM KONAZEWSKI
BY
ATTORNEY

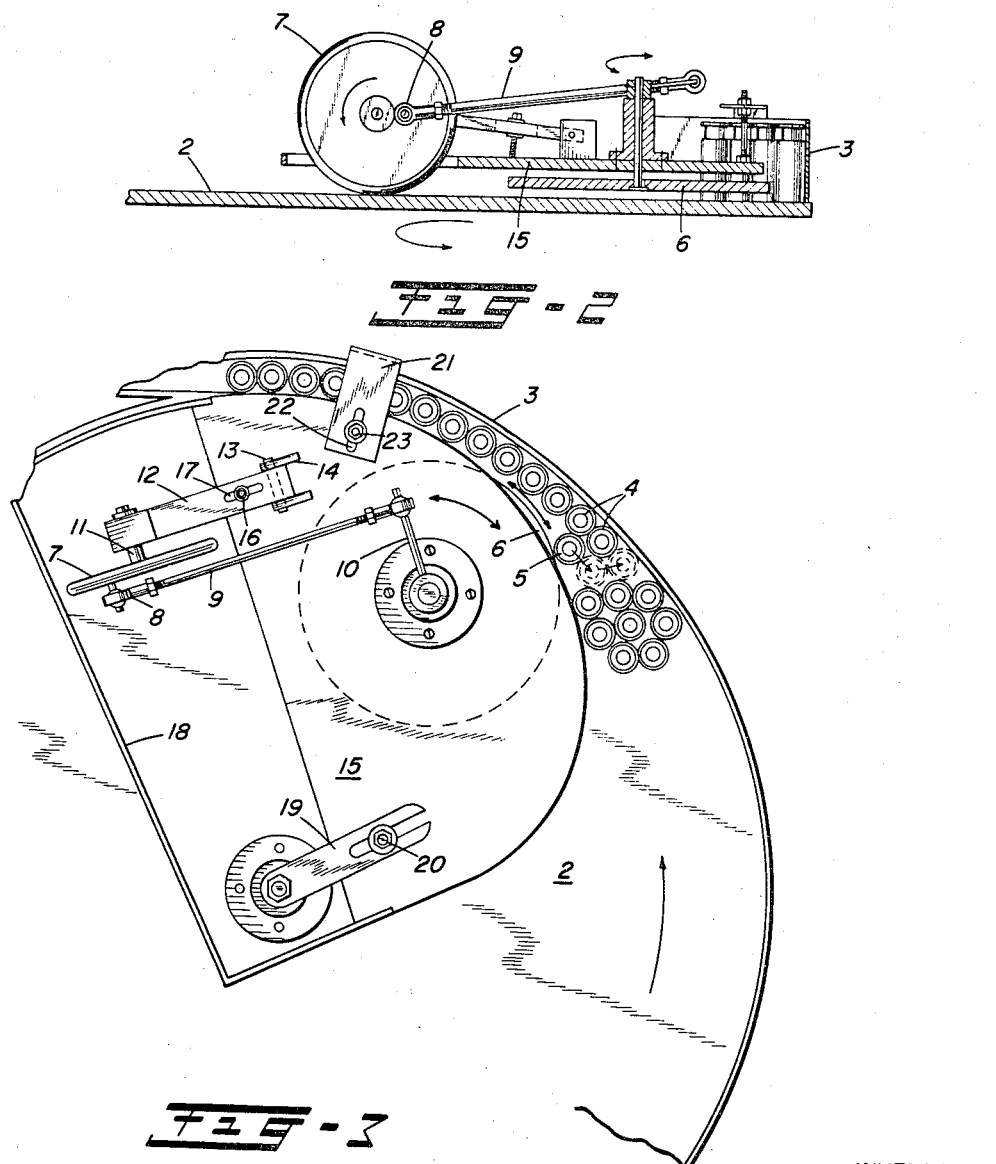

United States Patent Office 3,490,574
Patented Jan. 20, 1970

3,490,574
STERILE CONTAINER LOADING
Arthur Sinclair Taylor, Spring Valley, and Ellsworth Sandhage, Pearl River, N.Y., George Bott, Westwood, N.J., and William Konazewski, Pearl River, N.Y., assignors to American Cyanamid Company, Stamford, Conn., a corporation of Maine
Original application July 5, 1966, Ser. No. 562,620. Divided and this application Apr. 1, 1969, Ser. No. 812,084
Int. Cl. B65g 47/04
U.S. Cl. 198—30   9 Claims

ABSTRACT OF THE DISCLOSURE

A mechanism is described for unloading trays of empty vials or other containers and arranging them in single file feeding them onto a moving conveyor. The problem of bridging which results when a container touches two other containers and so projects beyond a single file is solved by having a plate above the conventional slowly turning turntable which is raised above it so that it will encounter the body of the containers and which is oscillated through a small arc. The plate which has a much smaller diameter than the turntable extends so that its periphery is near but not quite at one edge of a single file of vials. When bridging occurs the oscillating plate rolls the vial in question into place in single file and the file then moves on between the conventional guide tracks. The mechanism is particularly useful for empty sterilized vials which tend to adhere and so make bridging especially serious.

RELATED APPLICATIONS

This application is a division of our prior application Ser. No. 562,620 filed July 5, 1966, and now Patent No. 3,453,804, July 8, 1969, "Stoppering Mechanism".

BACKGROUND OF THE INVENTION

In the past empty vials or containers have been transferred from trays into a single file which is guided onto a conveyor by means of a horizontal, slowly rotating turntable provided with a peripheral fence and another fence spaced therefrom the width of a vial and ending in a curved spring portion. As the turntable rotates vials are pushed against the curved spring portion of the fence which moves the vials out toward the peripheral fence forcing them into a single file. The spring operates fairly satisfactorily with vials which have not been heat sterilized. However with heat sterilized vials there is a tendency for vials to adhere to each other and for one of them to adhere to two other vials outside of a single file configuration. This is normally known as bridging and can cause considerable problem with a sufficiently strong spring section to force the vial into single file. This can result in vials being tipped over.

SUMMARY OF THE INVENTION

The present invention eliminates the problem of bridging when vials or other containers are to be forced in a single file into a track using a horizontal rotating loading turntable. Bridging is positively eliminated even with heat sterilized vials by providing a smaller plate slightly above the turntable so that it contacts the sides of the vials which plate is oscillated through a small arc by drive which may be taken synchronously from the turntable drive. The small oscillating plate is eccentrically located with respect to the center of the turntable and has its edge projecting to a point a little more than the width of a container from the outside fence of the conventional horizontal turntable loader. When a vial adheres to two others which are being urged in a single file and causes bridging it contacts the oscillating edge of the small plate and is rolled into single file. This is a positive action and does not require a strong spring section of a fence and hence, even with vials which tend to bridge seriously such as heat sterilized vials, eliminates briding without problems of upsetting vials and the like. While the device of the present invention is particularly useful with heat sterilized vials which are notorious for their tendency to bridge it can of course also be used with vials which have not been sterilized and which can be ordered in a single file with spring fences.

The tray unloading and single file forming mechanism of the present invention lends itself readily to being enclosed, except for the entrance for trays of empty vials, and can be joined to a continuous conveyor which carries a single file of vials past other stations which can fill them, stop with them and the like. Operation under completely sterile conditions is thus made readily possible.

As the present invention has nothing to do with the details of filling, stoppering and other operations only so much of an automatic continuous conveyor line is shown in the drawings and in the specific description which follows, as is needed to illustrate how the mechanism of the present invention fits in to a system which conveys a single file of vials through a series of operations.

BRIEF DESCRIPTION OF THE DRAWINGS

FIGURE 2 is a vertical section of the drive of an anti-bridging mechanism for empty container loading,
and
FIGURE 3 is a plan view of a portion of the empty container loading mechanism showing the anti-bridging device of FIGURE 2 in plan.

Figure 1:
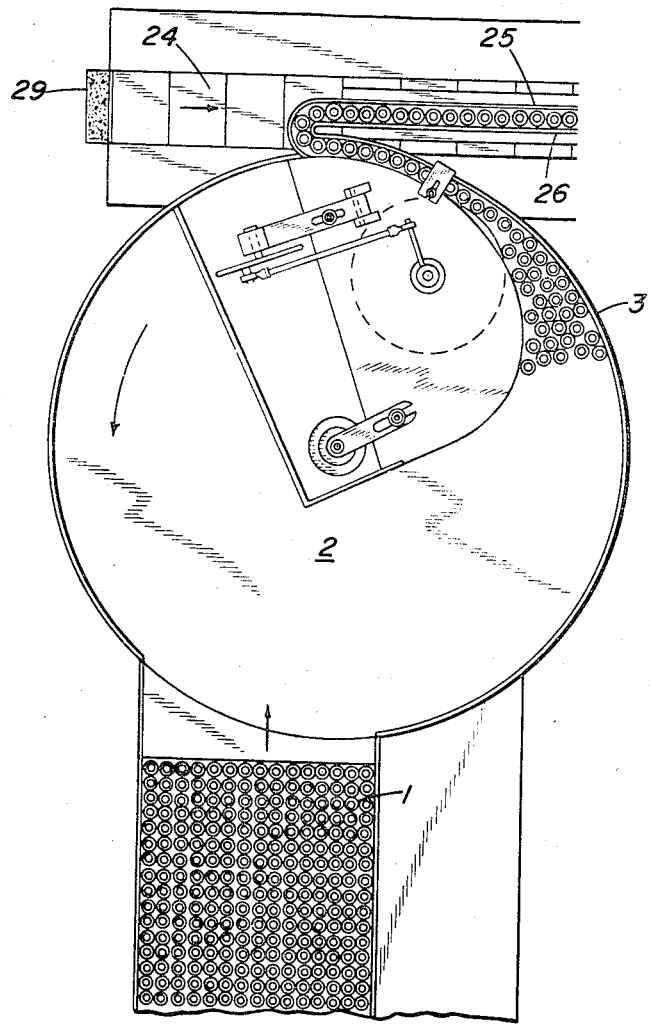
FIGURE 1 is a plan view of a tray unloader and a portion of a conveyor for an automatic system.

As can be seen on FIGURE 1, sterilized vials, open end up, are loaded from trays 1 onto a slowly rotating plate 2 which forms part of a conventional bottle loader which, in conjuction with the usual fenced track 3 at one point of its periphery, aligns the vials in what is hoped to be uniform single file. The conventional loader, parts of which are used in the present invention, is provided with a new anti-bridging device, which will be described in more detail below in connection with FIGURES 2 and 3, and which prevents bridging and hence empty spaces in the line of vials formed.

A whole tray of vials, for example containing 1200, are moved onto the slowly rotating plate 2 of the vial loader by pushing in the conventional manner. FIG. 1 shows a full tray ready to be pushed onto the loader. This portion of the loader is not new with the present invention and is, therefore, shown diagrammatically. The vials are pushed through a low opening into the loader, which is covered, as is all of the production unit track, and this permits the maintenance of sterile conditions in ways which are, in themselves, known. Thus, for example, sterilizing ultraviolet radiation from suitable sterilamps, maintenance of a slight positive pressure of filtered and preferably sterile air and the like. As these procedures are well known, they are not specifically illustrated, and therefore FIG. 1 shows a portion of the production line with the cover removed so that the operation is clearly shown.

FIG. 3 shows, on an enlarged scale, the phenomenon of bridging, which occurs with conventional vial loaders. As the vials are urged by the slowly rotating loader plate 2 against the guiding fence 3 at the periphery, some vials can wedge themselves between two other vials to form a triangle. This is shown in FIG. 3 with two vials which are in the proper direction of the track shown at 4 and the slightly offset vial touching them 5 forming a bridge. This phenomenon is, therefore, known as bridging and is the bane of conventional vial loaders and aligners.

In FIG. 1, and in detail in FIGS. 2 and 3, a new anti-bridging element is shown. This is a small circular plate 6 with its axis eccentric to the axis of the main loading plate 2. It is oscillated through a small arc by a drive wheel 7 which rolls on the plate 2. The wheel 7 is provided with a projection 8, eccentrically located, on which a crank arm 9 is journaled. This in turn oscillates the anti-bridging plate 6 through another crank arm 10. The drive wheel 7 is provided with an axle 11 which is journaled in an arm 12, this arm being provided at its other end with a pin 13 which is rotatable in a mounting 14 on a frame or plate 15. Pressure of the wheel 7 against the plate 2 is provided by the bolt 16 which passes through a slot 17 in the arm 12. The framework 15 is also adjustably mounted on a second framework 18 through the slotted arm 19 with bolt 20 and is supported at another point by a second arm 21 which rests on the fence 3. This arm is also provided with a slot 22 and bolt 23 so that the exact position of the anti-bridging plate can be accurately fixed in accordance with different vial sizes. It will be seen from FIGS. 2 and 3 that the anti-bridging plate 6, is between the framework 15 and the main rotating loader plate 2, projecting slightly beyond the framework 15 and so, when properly adjusted, its oscillation will roll a bridging vial into line. This completely solves the bridging problem and assures that the vials are lined up in single file and are moved onto a moving conveyor belt 24 as is shown on FIG. 1.

On the conveyor 24, which has a very smooth surface and may, for example, be formed of polished metal plate links, the vials are moved in the direction of the arrow between two guide rails 25 and 26 which form a track only slightly wider than the diameter of a vial. Track alignment is maintained adjustably by the screws 27 and 28 and can be adjusted simply for vials of different size. A sponge 29, which is preferably kept soaked with disinfectant, serves to wipe off any spillage on the conveyor 24 and to maintain it in a disinfected state.

We claim:

1. A container loading machine for loading containers in single file on to a conveyor means comprising in combination a slowly rotating horizontal plate, guiding means for guiding containers at the periphery of the plate into single file, a smaller circular plate mounted above the slowly rotating horizontal plate sufficiently so that it contacts the side of a container, the axis of said smaller plate being eccentric to the axis of the rotating horizontal plate, means for oscillating the smaller plate through a small arc, said smaller plate approaching the guiding means at the periphery of the rotating plate by a distance only slightly greater than a container cross section, whereby containers moving slightly out of line and causing bridging contact the periphery of the second plate and are rolled thereby into exact single file without spaces between containers.

2. A machine according to claim 1 in which the guiding means are associated with and extend over a continuous conveying means with a smooth surface said conveying means having a continuation of the guiding means to maintain the containers in single file.

3. A machine according to claim 2 in which means are provided for applying antiseptic liquid to the surface of the conveying means before it reaches the guiding means.

4. A machine according to claim 3 in which the smaller plate is oscillated by drive synchronous with the drive of the slowly rotating horizontal plate.

5. A machine according to claim 1 in which the smaller plate is oscillated by drive synchronous with the drive of the slowly rotating horizontal plate.

6. A machine according to claim 2 in which the smaller plate is oscillated by drive synchronous with the drive of the slowly rotating horizontal plate.

7. A machine according to claim 4 comprising means for maintaining a sterile atmosphere over the containers during loading and conveying.

8. A machine according to claim 5 comprising means for maintaining a sterile atmosphere over the containers during loading and conveying.

9. A machine according to claim 6 comprising means for maintaining a sterile atmosphere over the containers during loading and conveying.

References Cited

UNITED STATES PATENTS

| | | | |
|---|---|---|---|
| 2,389,496 | 11/1945 | Gagnon | 198—32 |
| 3,376,970 | 4/1968 | Roseberg | 198—30 |

RICHARD E. AEGERTER, Primary Examiner

U.S. Cl. X.R.

198—32